United States Patent [19]

Stancescu

[11] Patent Number: 5,577,844
[45] Date of Patent: Nov. 26, 1996

[54] STANDARD ROTATING BUSHING

[76] Inventor: Petrisor D. Stancescu, 1796 De Champlain, Montreal, Quebec, Canada, H2L 2S8

[21] Appl. No.: 253,292

[22] Filed: Jun. 3, 1994

[51] Int. Cl.⁶ .................................................. F16C 19/04
[52] U.S. Cl. ........................................ 384/484; 384/513
[58] Field of Search ................................. 384/484, 512, 384/513, 569

[56] References Cited

U.S. PATENT DOCUMENTS 4,605,319  8/1986  Korenhof ................................. 384/484
4,611,933  9/1986  Hofmann et al. ....................... 384/512

Primary Examiner—Lenard A. Footland

[57] ABSTRACT

The present invention generally relates to the field of jig bushings, and in particular, the present invention is concerned with the field of jig bushings for guiding drills, taps or combination drill & tap tools. Even more particularly the present invention is concerned with the field of rotating bushing that guides a cutting tool and independently will rotate when the cutting tool touches the inner wall of it during the drilling and tapping processes.

2 Claims, 2 Drawing Sheets

STANDARD ROTATING BUSHING

CROSS-REFERENCES TO RELATED APPLICATIONS

The hole tapping process consists of two separate operations:
a. drilling of the hole using a bushing for guiding
b. tapping of the previously drilled hole without any guiding.

We use the generic name bushing in that text. There are used different types of bushing in the drilling processes:
headless press fit bushing
head press fit/slip-fixed renewable bushing
special/custom purpose bushing.

Statement as to Rights to invention made under Federally sponsored research and development: Not available.

BACKGROUND OF THE INVENTION (1) Field of Invention

This invention introduces the standard rotating bushing in the drilling, the tapping and the combined process of drilling and tapping. The drill, tap and combination drill & tap are the tools that use this invention. The standard rotating bushing guides the standard letter, number and fractional size tools defined by the American National Standards Institute. The standard rotating bushing guides the analogous standard Metric tools, too. The standard rotating bushing sizes are designed to be Catalogue Standard Sizes and identify the standard rotating bushing as ANSI Standard Bushing.

(2) Description of Prior Art

The bushing used in drilling process is single unit. The tool touches the inner wall of it and shaves it during the drilling process, that fact determinate the increasing of the bushing standard interior diameter tolerance. The consequence is that the bushing wears out and must be frequently replaced. It does not exist any standard bushing for the tapping process and the combined process of drilling and tapping.

SUMMARY

This invention refers to a standard rotating bushing for:
the drilling process
the tapping process
the combined process of drilling and tapping.

The bushing used in drill process is single unit. The tool touches the inner wall of it and shaves it during the drilling process, that fact determinate the increasing of the bushing standard interior diameter tolerance. The consequence is that the bushing wears out and must be frequently replaced. It does not exist any standard bushing for the tapping process and the combined process of drilling and tapping.

I have found that these disadvantages may be overcome by use of a standard rotating bushing. The using of this invention maintains bushing standard interior diameter tolerance in drilling process. The inside rotating ring guides the tool and separately will rotate and will not be shaved if the tool touches the inner wall of it during the drilling process. The consequence is that the bushing does not wear out and is seldom replaced. This invention introduces the first standard bushing for the tapping process and the combined process of drilling and tapping.

The rotating bushing can be manufactured in several types. The single-row rotating bushing withstands a small amount of tool misalignment or deflection (used for a first range of tool diameter). The double-row rotating bushing carries bigger tool misalignment or deflection (used for a next range of tool diameter).

The components of the invention are the inside rotating ring (1) that guides the tool and separately will rotate if the tool touches the inner wall of it during the drilling and tapping process. The balls (3) are inserted in machined grooves in the outside non-rotating ring (2) by moving the inside rotating ring (1) to an eccentric position. The balls (3) are separated after loading and the separator (4) is then inserted. The separator (4) has the important function of separating the elements so that the rubbing contact will not occur. The standard rotating bushing comes with shields (5) on both sides. The shields (5) are not a complete closure but do not offer a measure of production against chips and dirt and to retain the lubricant. The rotating bushing is lubricated after the manufacturing. The shields (5) are placed in machined grooves in the inside rotating ring (1) and in the outside non-rotating ring (2).

BRIEF DESCRIPTION OF THE DRAWINGS

In drawings that illustrate embodiments of the invention.

These figures show the five parts of the rotating bushing:
1. the inside rotating ring
2. the outside non-rotating ring
3. the balls
4. the separator(s)
5. the shields.

Figure 4:
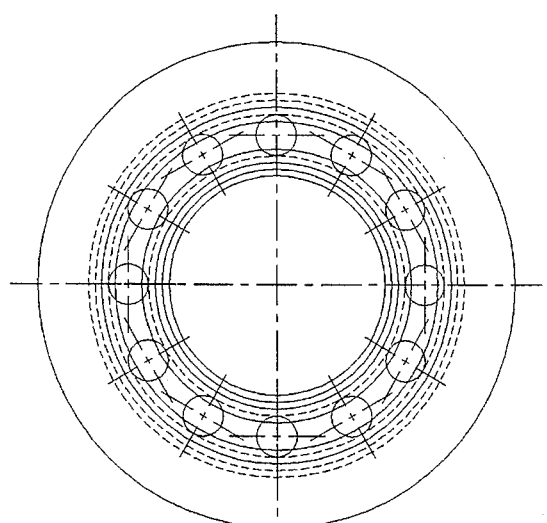
FIG. 4 is the top view of the FIG. 5 and FIG. 6.
Figure 5:
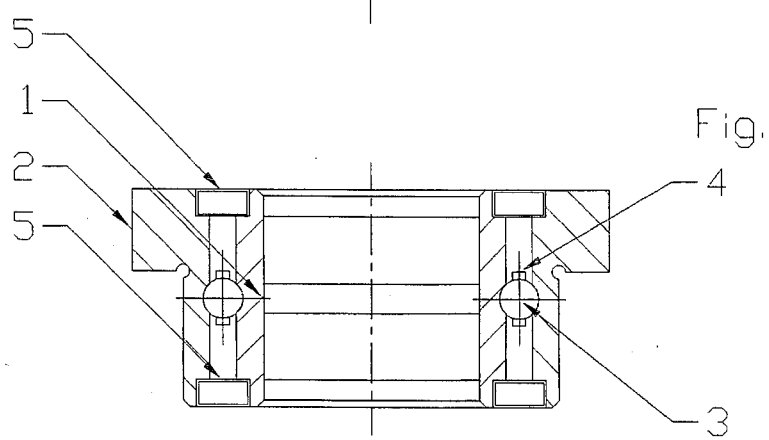
Figure 6:
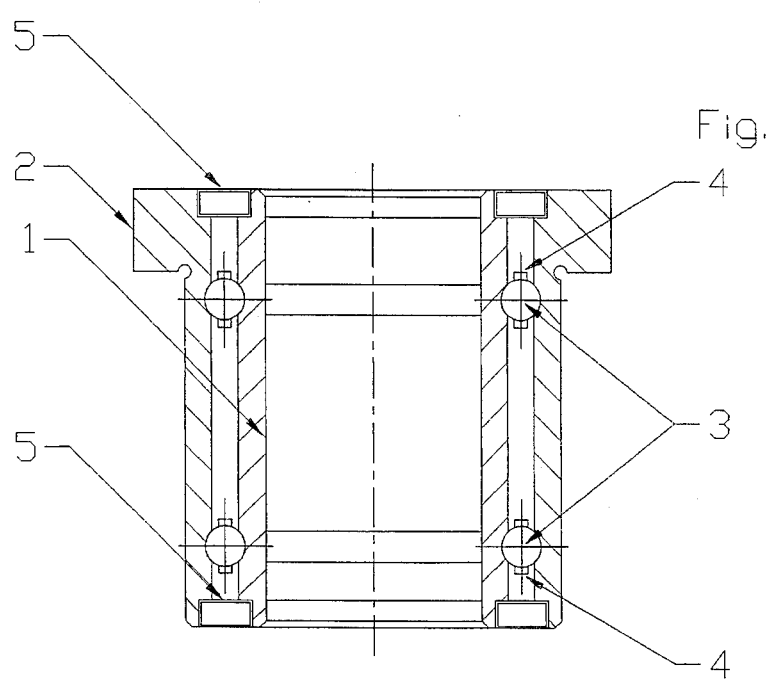
Figure 1:
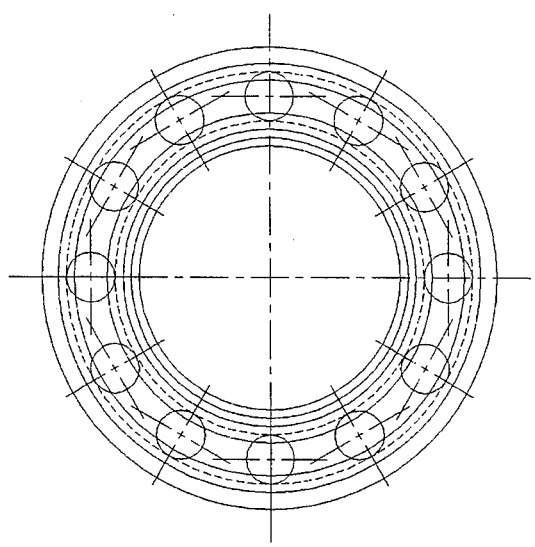
FIG. 1 is the top view of the FIG. 2 and FIG. 3.
Figure 2:
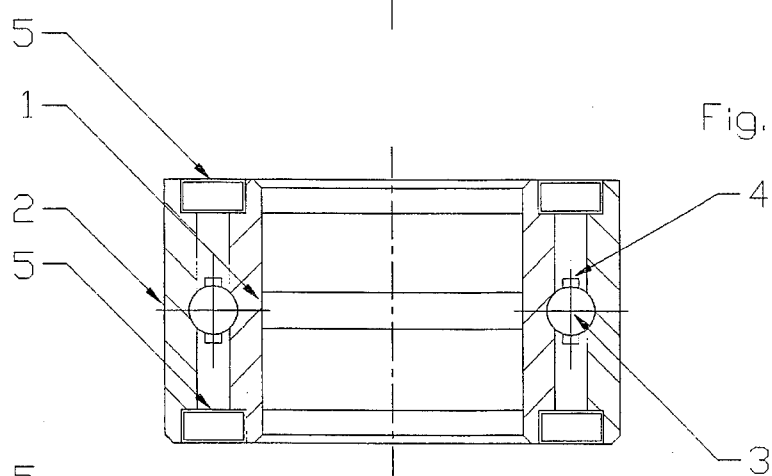
Figure 3:
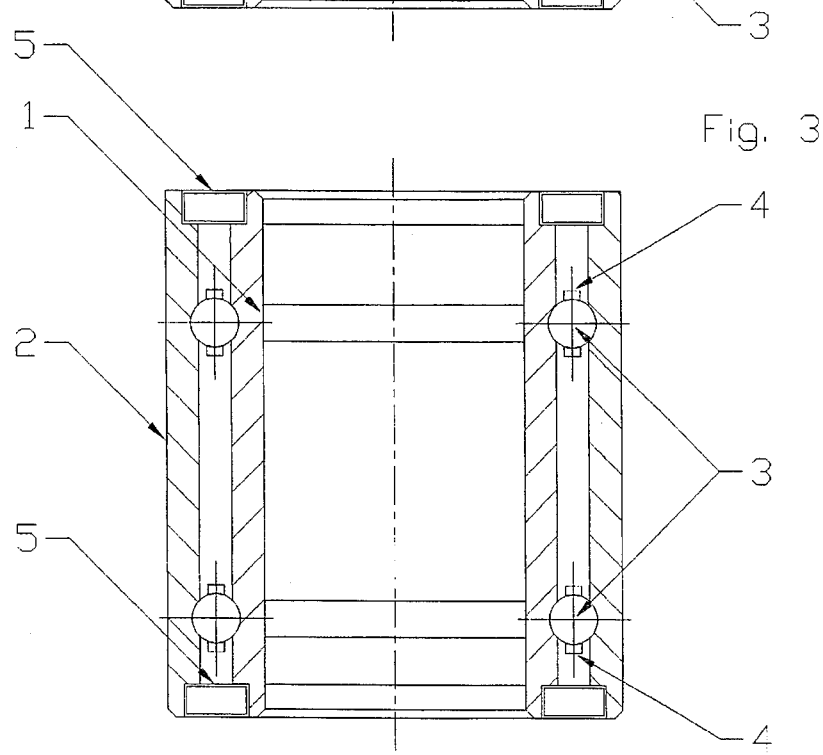

The rotating bushing can be manufactured in several types:
a. single-row;
a1. headless press fit—FIG. 1 and FIG. 2
a2. head press fit/slip-fixed renewable—FIG. 4 and FIG. 5
b. double-row:
b1. headless press fit—FIG. 1 and FIG. 3
b.2. head press fit/slip-fixed renewable—FIG. 4 and FIG. 6.

DESCRIPTION OF THE PREFERRED EMBODIMENTS

The preferred embodiments of the invention are:

A standard rotating bushing used in the drilling process, the tapping process and the combined process of drilling and tapping. This bushing will comprise an inside rotating ring, an outside non-rotating ring, balls, separator(s) and shields. The inventive concept is that the inside rotating ring guides the tool and separately will rotate if the tool touches the inner wall of it during the performance of the process. The standard rotating bushing can be manufactured in several types:
a. single-row:
a1. headless press fit
a2. head press fit/slip-fixed renewable
a3. special/custom purpose.

b. double-row:

b1. headless press fit b2. head press fit/slip-fixed renewable b3. special/custom purpose.

The embodiments of the invention in which an exclusive property or privilege is claimed are defined as follows:

1. A process of using a ball bearing for drill and tapping, said process comprising the steps of:

(a) employing a bearing with at least one row of balls, an inner ring with inner diameter larger than that of a drill or tap tool or combination of drill and tap tool, to be used with the bearing, and an outer ring with a head of diameter larger than the rest of the outside diameter of the outer ring, and (b) using the ball bearing to guide a drilling or tapping tool, or combination drilling and tapping tool, wherein the inner ring guides the tool and will rotate and will not be shaved if the tool touches the inner wall of said inner ring during the drilling, tapping, or drilling and tapping process, to allow guidance of said drill or tap or combination drill and tap tool, without shaving the inner ring, to permit increased wear life of the bearing.

2. The process of claim 1 and further comprising employing a bearing with two rows of balls, to provide for correction of larger degrees of tool misalignment or deflection.

* * * * *